Sept. 22, 1970 R. B. DUGGINS 3,529,325
MOLD FOR CASTING SIMULATED MARBLE BUILDING PRODUCTS
Original Filed Aug. 31, 1966 4 Sheets-Sheet 2
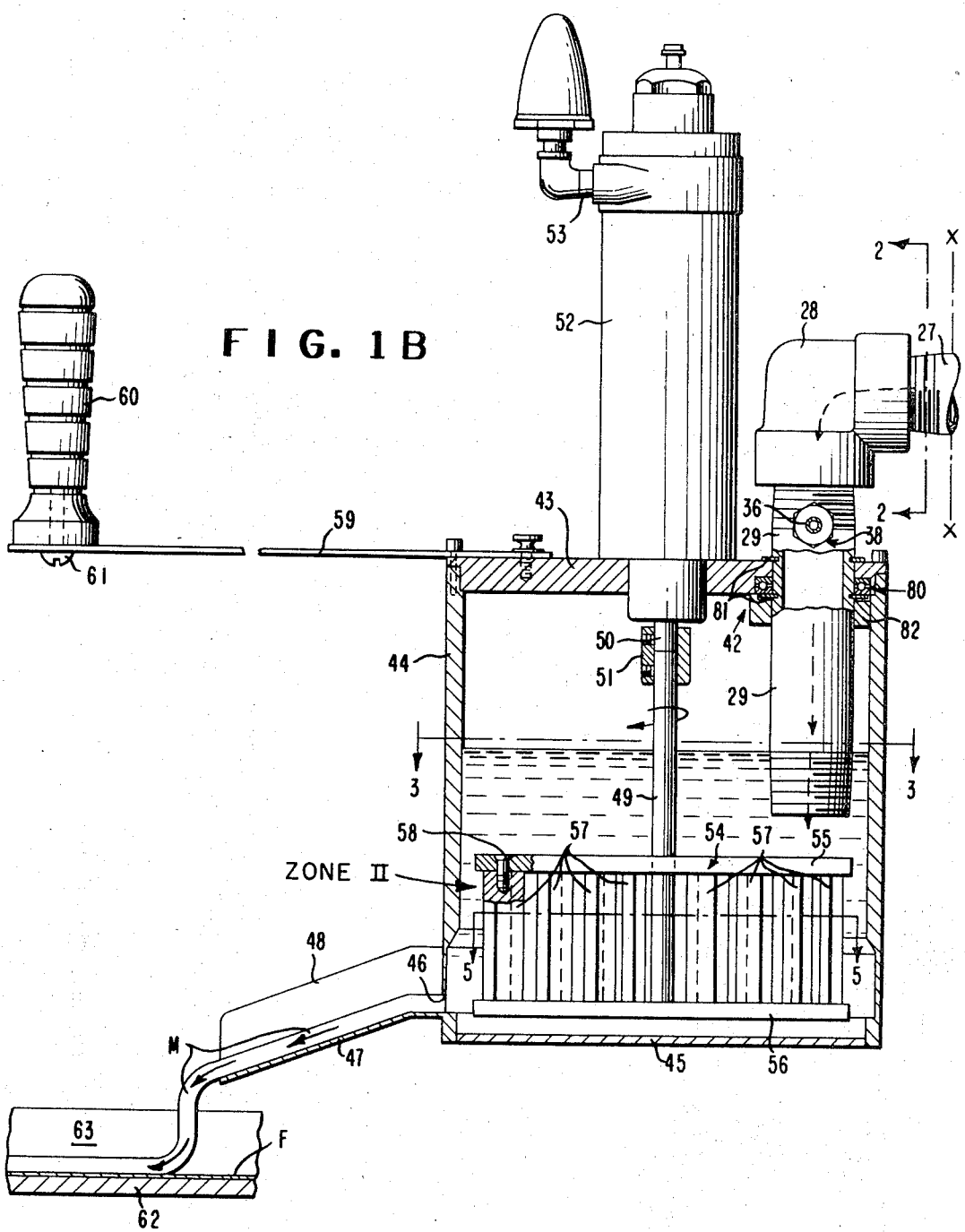
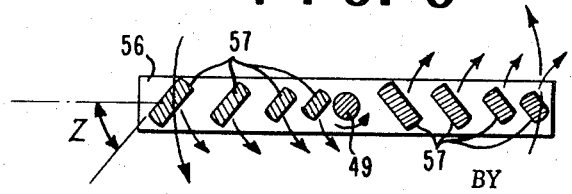
INVENTOR
RAY BROWN DUGGINS
BY
ATTORNEY Sept. 22, 1970  R. B. DUGGINS  3,529,325
MOLD FOR CASTING SIMULATED MARBLE BUILDING PRODUCTS
Original Filed Aug. 31, 1966  4 Sheets-Sheet 4

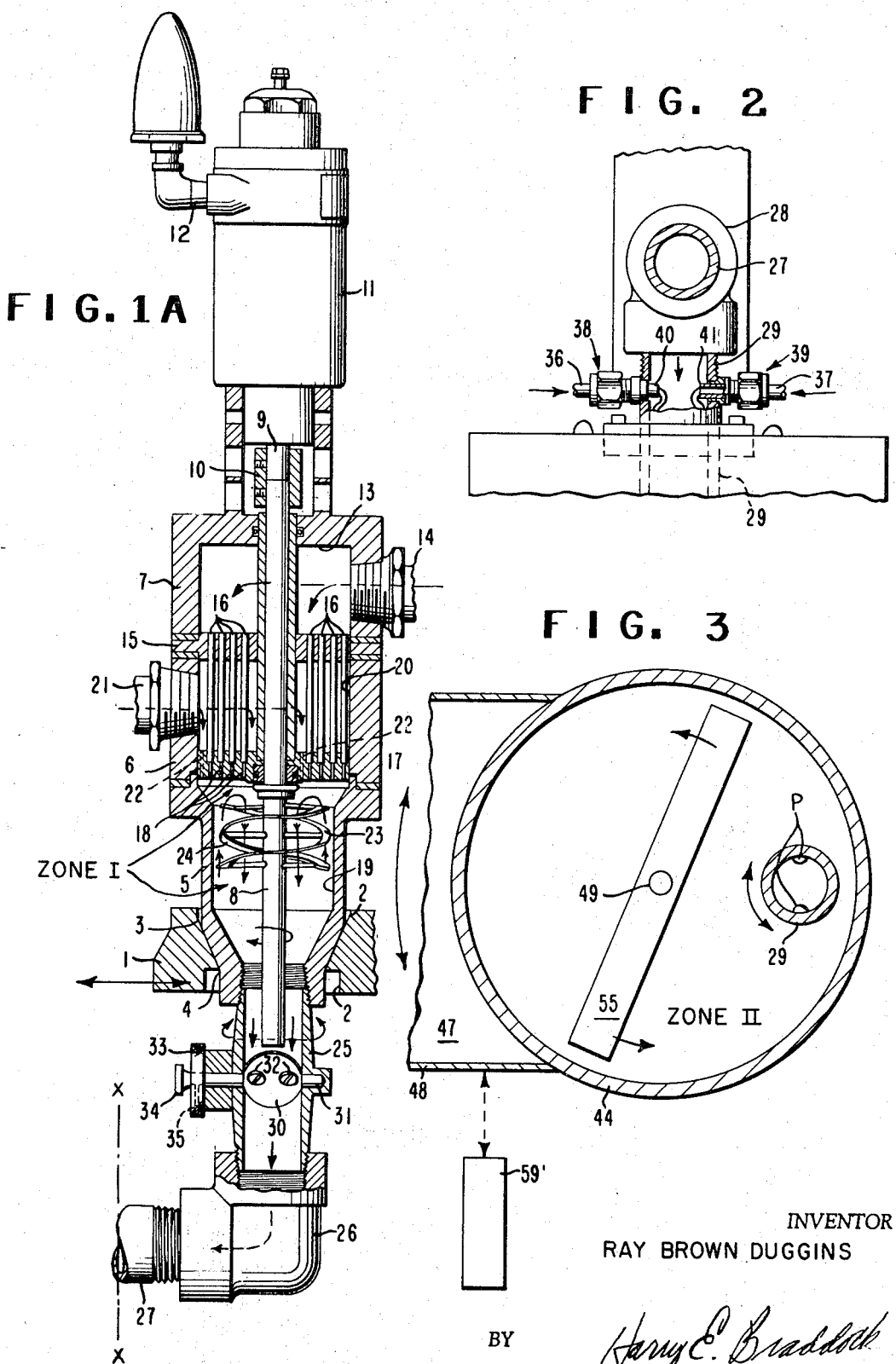

INVENTOR
RAY BROWN DUGGINS

BY

ATTORNEY

United States Patent Office 3,529,325
Patented Sept. 22, 1970

1

3,529,325
MOLD FOR CASTING SIMULATED MARBLE BUILDING PRODUCTS
Ray Brown Duggins, Chadds Ford, Pa., assignor to E. I. du Pont de Nemours and Company, Wilmington, Del., a corporation of Delaware
Original application Aug. 31, 1966, Ser. No. 576,303. Divided and this application Dec. 19, 1968, Ser. No. 794,839
Int. Cl. B29c 1/00
U.S. Cl. 18—34                        3 Claims

ABSTRACT OF THE DISCLOSURE

An improved mold assembly for receiving a shrinkable, solidifiable mass of material is provided by the use of a thin, smooth, continuous layer of a non-reactive, organic, polymeric material, with shrinkage properties that match those of said mass of material, between the mold support and said mass of material.

---

This application is a division of Ser. No. 576,303, filed Aug. 31, 1966 by the same inventor.

This invention relates generally to the field of improved cast slabs, panels, and units useful in the building arts and having a predetermined controlled appearance and structure pleasingly similar to natural stone, such as marble, in a number of respects. Also involved is an improved commercially feasible apparatus and process arrangements by which these products are made from certain polymeric compositions.

More specifically the invention involves a relatively high speed continuous operation apparatus which produce such products in a form possessing predetermined multi-colored three-dimensional patterns, or veins, or streams in differently colored background materials, the patterns having a degree of controlled irregularity to simulate certain desirable aspects of natural stone or marble, yet also having a high degree of reproducibility and flexibility to enable not only predetermined controlled variation of a given product's appearance, but also selective re-creation or duplication of any given pattern or appearance previously prepared by the manufacturing arrangement of the invention.

The natural beauty of certain stone formations such as marble has stimulated the desire by many persons over the years for their simulation in man-made products. In relatively recent years products simulating marble have been created by incorporating colored pigments into heavily loaded or filled resin bases. Examples of some of these prior art products and manufacturing arrangements are disclosed in U.S. Pats. Nos. 1,120,632, 1,638,109, 2,040,863, 2,280,488, 1,699,413, 1,845,457, and 3,050,785. These types of "marbleized" resins are produced commercially in the United States and are referred to many times as cultured marble. These materials have been generally made by mixing a filler such as calcium carbonate with an epoxy or polyester type resin and thereafter adding and manually swirling in a pigment before gelation, or curing of the material takes place. This action, or "marbleizing" is generally done in much the same random uncontrolled way as two-flavor frostings are prepared on cakes. The known prior art indicates that most producers of "marbleized" products add the coloring or veining pigments and swirl them by hand action into the polymerizing base in random fashion with no form of control or preselection of pattern exerted thereon. However it has been determined that in the manufacture of a relatively uniform commercial product of this type, it is important to create a general yet variable type of pattern or veining which produces a pleasing marble-like effect of high appeal to potential customers. Since the prior art manufacturing arrangements do not appear to control, other than in a manual random fashion the formation of the multi-colored patterns or veining, it is not believed possible for the prior art arrangements to prepare a reproducible pattern which is generally uniform in appearance of vein structure with respect to the dimension, shape, direction, depth, and other characteristics of the pattern of a previously produced product.

It was another object of the invention to provide effective and reliable apparatus arrangements for manufacturing the product of the invention, preferably of polymeric materials such as poly (methyl methacrylate) filled with calcium carbonate.

The objects of this invention have been achieved by the product of a castable, flowable stream of predetermined dimensions of a polymerizing material throughout which is physically distributed at least one discrete, continuous, coherent, separately identifiable smaller stream of compatible material of a different color, in a predetermined, repetitive reproducible, irregular three-dimensional configuration, by a manufacturing arrangement involving process steps and means for bringing together polymerizable ingredients, initiating polymerization and mixing said materials thoroughly under predetermined controlled conditions of temperature and pressure in a first confined zone of high intensity intimate mixing action, forming a first flowable stream of highly mixed polymerizing material of predetermined density, viscosity and reactivity, conducting said first stream under predetermined controlled conditions of temperature and pressure, and at a predetermined flow rate into a second zone of limited low intensity mixing action, said process further comprising, just prior to entry of said first stream into said second zone, adding to said first stream of highly mixed polymerizing material, at a predetermined flow rate, at least one discrete coherent additional flowable stream of compatible material with a color differing from that of said first stream, said additional stream having properties selected and controlled such that the additional stream does not diffuse or intimately mix with said first stream but forms with the first stream a composite stream of at least two coextensive, substantially distinct, coherent, separately identifiable portions of predetermined proportions, in said second zone accumulating a mass of predetermined size and shape of the composite stream material, and applying to said mass a limited controlled low order mixing action of predetermined low intensity under predetermined controlled conditions to progressively displace the second stream in a predetermined reproducible three-dimensional configuration throughout the accumulated mass while substantially maintaining the integrity and continuity of said second stream, said process further comprising extruding a portion of the mass from said second zone at predetermined flow rates through a restricted orifice of predetermined dimensions to form an extruded flowable stream which stream comprises the material of said first stream of polymerizing ingredients and the material of the second stream, said predetermined rates, conditions, and dimensions all controlled and coordinated such that the second stream of material is distributed with its integrity maintained throughout the extruded stream in a predetermined, repetitive, reproducible, three-dimensional, irregular pattern and predetermined color relationship prior to solidification of either stream, conveying said extruded stream to a mold assembly under controlled flow conditions, and allowing said material of the extruded stream to solidify in said mold assembly.

Additional objects and advantages will appear from a consideration of the following specification and claims taken in conjunction with the accompanying drawings in which:

FIGS. 1A ad 1B represent a vertical longitudinal cross sectional view taken through an apparatus embodying features of the invention for manufacturing the improved products of the invention; certain parts being broken away to better illustrate the construction and cooperation of the apparatus features.

FIG. 2 is a transverse cross sectional view of the apparatus of FIG. 1 taken at line 2—2.

FIG. 3 is a transverse cross sectional view of the apparatus of FIG. 1 taken at line 3—3.

FIG. 5 is a transverse cross sectional view of the apparatus of FIG. 1 showing the details of the rotating material displacing member.

Figure 4:
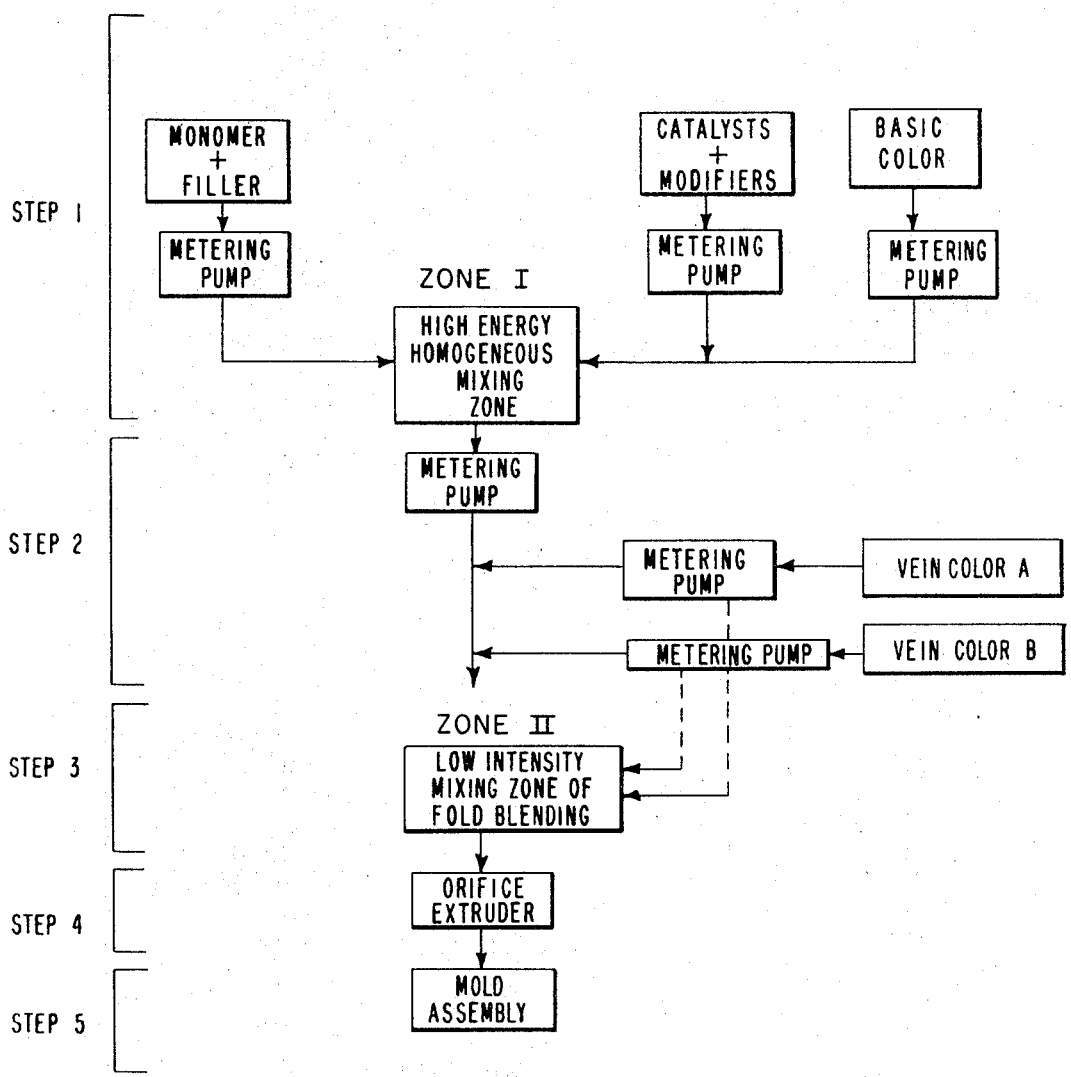
FIG. 4 is a block diagram illustrating the general manufacturing process arrangement.

The improved apparatus is illustrated in FIG. 4 and generally comprises the following basic steps: bringing together in a reaction zone (Zone I) under controlled conditions, monomer and polymer sirups, fillers, base-colored pigments, catalysts, promoters, and modifiers; subjecting these materials to a high intensity intimate mixing action to produce a homogeneous, uniformly colored, polymerizing mass; conducting this polymerizing viscous mass into a second zone (Zone II) under metered, controlled conditions while adding at controlled rates separate streams of pigments to form vein patterns which differ from the base color; subjecting this viscous mass collected in the second zone to a controlled low intensity mixing action at predetermined controlled shear rates to progressively displace the separate streams of pigments throughout the polymerizing mass in a controlled predetermined general pattern or structure; extruding this mass from the second zone through an orifice of predetermined size; and conducting the extruded stream under streamline flow conditions to a mold assembly to complete polymerization and/or cure.

The steps of bringing together the necessary ingredients and causing high intensity mixing action to produce the substantially homogeneous polymerizing mass may be accomplished in a number of suitable procedures known to the art. However, the following steps relating to the controlled addition and handling of the pigment streams are the most important and significant so far as the invention is concerned. As mentioned above, the initial stream of polymerizing material is conducted under controlled predetermined conditions of temperature and pressure, and at predetermined controlled flow rates into the second zone for a particular low intensity mixing action. Into this stream are added streams of pigment in the form of colored pastes through one or more entry parts either prior to or at entry of the stream into the second zone. These colored streams are metered into the stream of polymerizing material at predetermined controlled rates of flow and are positioned in the polymerizing material such that at least one distinct coherent flowable stream of compatible colored material differing in color from the color of the polymerizing material is introduced and folded into the polymerizing material under controlled conditions predetermined by the desired pattern, such that the colored stream does not diffuse or mix intimately with the polymerizing material but forms with the first stream a composite body of at least two coextensive substantially distinct coherent separately identifiable portions of predetermined proportions. As the colored stream or streams are folded into the polymerizing material they are progressively displaced through this material in a predetermined reproducible three - dimensional configuration throughout the polymerizing mass collected in the second zone with the integrity and continuity of the colored streams substantially maintained. The composite body or mass is extruded through an orifice in the structure defining Zone II at predetermined flow rates and under streamline flow conditions prior to entering a mold assembly. The flow rates, conditions, and dimensions of the extruded material and its orifice are controlled so that the extruded composite stream comprises colored veins or streams, with their integrity maintained distributed throughout the polymerizing material in a predetermined, repetitive, reproducible, three-dimensional, irregular pattern having predetermined color relationship to the polymerizing material.

The final step involves conducting the extruded composite stream into a mold assembly in a predetermined controlled manner if desired, where gelation and formation of the solid article occur.

The process features of the invention for establishing the desired vein or colored stream depth, dimensions, structure, and appearance involve careful control of a number of variables or factors such as: viscosity of the polymerizing mixture, viscosity of the colored or pigmented stream mixture, the degree of mixing, the type of mixing and the manner in which the mold assembly is filled. Overall vein or colored stream patterns in the final product can be additionally affected by physical movement of the colored streams, the molding assembly, the extruded stream being conducted to the mold assembly, or a combination of any of these. These variables are discussed in the following section.

As to the viscosity of the filled polymerizing mass, the viscosity of the ingredients, as in many types of liquid mixing, is important. In the process of this invention the viscosity of the polymerizing filled basic material and the viscosity of the contrasting color pigment streams must be held within certain limits in order to control the structure and appearance of the vein or colored stream pattern. The viscosity of the basic polymerizing material, containing the catalyst, modifier, promoter and filler, should be in the range of 30–75 poises and preferably 44–64 poises at the time of mixing with the colored or pigmented material. (Viscosities as measured with a standard Brookfield Viscometer using spindle No. LV4 at 60 r.p.m.)

The viscosity of the colored material, or veining paste, should lie within a narrower and different range than is required for the filled polymerizing material and usually lies in the range of 0.9–3 poises. With a low degree of mixing, using low shear mixing blades or members, it has been found that the low viscosity veining paste gives better control over uncontrolled variations in the shape of the colored stream and over diffusion or blending of the colored stream, or veining paste, into the basic polymerizing material. It has been found possible and feasible (1) to control the thickness of the colored streams, or veins, by regulating the viscosity of the colored material, or veining paste, (2) to control the depth of penetration of the veining paste as it enters the streams of polymerizing material, (3) to control the thickness of colored streams as it enters the polymerizing material, (4) to control the depth and degree of shear in mixing the colored stream with the polymerizing material, and, if desired, (5) to control the vein construction and direction during filling of the mold assembly.

One or more colors in the form of colored streams or veining pastes can be added to the filled polymerizing material, each color usually added in quantities varying from about 46 to 140 mls. (2.5–9 cubic inches) of colored material, or pigment paste per cubic foot of the polymerizing material. The colored material can be added prior to or at the point of entry of the polymerizing material into the second zone. It has been found that each colored stream should be added separately through individual feed parts at positions spaced transversely of each other relative to the direction of flow of the stream of polymerizing material.

The lowest possible degree of mixing is employed in most cases. The colored streams or veining pastes are folded into the polymerizing material so that normally, considerably less than 5% blending takes place within the polymerizing material. In some cases a slight degree of blending or diffusion of the colored stream into the background polymerizing material enhances the three-dimensional vein pattern appearance by causing variation in the contrast between the veins or colored stream and the other material. A reduction in this contrast can be accomplished by varying the size of the colored stream and lowering its viscosity to about 0.9 poise where the normal value would be about 1.9 poises.

As to the type of mixing, the desired colored stream or vein patterns are produced by introducing the colored pigmented stream or paste into the polymerizing material with a material displacing member having a configuration that provides a very low shear mixing action. The veins are formed by directing controlled streams of colored pigments in diameters ranging from about $\frac{1}{16}$ to $\frac{1}{4}$ inch in thickness into the polymerizing material for distances approaching the thickness of the article to be cast or molded. The veins may also be formed by allowing the colored streams to fall in a controlled manner on the surface of the polymerizing material being given the low intensity mixing action. The colored streams or veins are formed in the polymerizing mass by means of a number of mixing blade elements engaging the material in the second mixing zone and having varying width material deflecting surfaces. Preferably the mixing blade elements are mounted on a rotary member or stirring arm and range in width from about $\frac{1}{32}$ to $\frac{1}{2}$ inch. The rotary member used in the described embodiments of this invention is rotated at speeds between 5 and 100 feet per minute, preferably about 15–40 feet per minute, the place of rotation being at an oblique angle to the general direction of flow of the polymerizing material through the zone. FIG. 5 illustrates a preferred mixing blade element and stirring arm design where the indicated angle varies between 30° and 60°. In such an arrangement, the mixing blade elements are adjusted such that the colored stream, or veining paste, is folded into the accumulated mass of polymerizable material in the low intensity mixing zone (Zone II) from the outer periphery of the mass toward its center by the mixing blade element on one side of the stirring arm, and is folded or displaced from the center of the mass toward its periphery by the mixing blade elements on the other side or end of the stirring arm. The blade elements can travel from 5–100 feet per minute at the extremities of the stirring arm and from about zero to about 10 feet per minute at or near the center of rotation of the arm. Usually the colored stream or veining pastes are added at or near the outer periphery of the path of the turning blade elements in the low intensity mixing zone with the stirring arm turning at about 20–40 r.p.m. while the polymerizing material is passing through the zone at rates of about 1–2 cubic feet per minute. The amount of blending taking place may be regulated by the varying rotational speed of the blade elements or by varying the rate of flow of the polymerizing material through the low intensity mixing zone. Normally for best results, the throughput of the polymerizing material through Zone II is adjusted such that at speeds of 22 feet per minute of the outermost blade elements, the polymerizing material is extruded from Zone II through an orifice $\frac{1}{4}$ inch wide and thereafter is subjected to laminar or streamline flow conditions for a distance of at least 2–6 inches at velocities in the range of from 8–120 feet per minute prior to entering the molding assembly. This is necessary to straighten the undesirable uncontrolled variations in colored vein configurations. Usually the direction of flow under streamline conditions is substantially perpendicular to the line of movement of the ends of the stirring arm as they pass the extrusion orifice. The streamlined flow is required for a distance of at least about 2 inches but may exist for distances of 2 or 3 feet or more prior to entry of the polymerizing material into the mold. The apparatus for producing the articles of the invention will be described in greater detail at a later point in this specification. The colored stream or veining paste is preferably directed into the low intensity mixing Zone II as shown in the drawings.

For best results in filling mold assemblies and reproducibility of patterns where the extruded stream from the second mixing zone is narrower than the mold assembly, a controllable preset programming means for controlling laydown of the extruded stream is required as shown schematically in FIG. 3. Where the width of the extruded stream with its particular pattern corresponds to the width of the mold assembly a direct one-pass lay-down of the extruded stream is the desired mold assembly filling technique. Where less control and a smaller degree of reproducibility is acceptable, the lay-down of the extruded stream of polymerizing material can be accomplished by manually programming the extruded stream of given width into a wider mold assembly. Where the extruded stream is considerably narrower than the mold assembly in which it is being laid down, a preferred arrangement is one which results in the stream and its vein pattern being laid down in a direction which generally forms an angle of about 45° to the horizontal rectangular dimensions of the mold assembly. This results in cast articles having patterns that can be matched effectively and which show the vein pattern to good advantage along the cut or beveled edges.

Another point of considerable importance in the mold assembly filling operation is the arrangement required to achieve a clean smooth glossy finish on the major "use" surface of the cast article. Usually the extruded stream of polymerizing material is laid down in a mold assembly which preferably comprises a flat tray unit with side walls or raised side edges to contain the cast material, the major "use" side of the cast article being that surface which is laid down in contact with the bottom of the tray unit. In order to achieve a clean smooth glossy finish on the surface of interest of the cast article, and prevent adherence to the mold assembly, it has been found highly desirable to place a thin disposable film (F) of organic polymeric composition in the flat tray unit as shown in FIG. 1B, such that it is interposed between the unit and the material being laid down therein and prevents contact of the material with the mold assembly. Such a film or sheet should possess a clean smooth glossy surface and be compatible but non-reactive with the material being cast thereon. It is an important requirement that the shrinkage properties of this film be substantially matched to the shrinkage properties of the polymerizing material placed thereon in the mold assembly. This material and the bottom of the tray unit can reach temperatures as high as 250–300° F. It is believed that the high degree of shrinkage of the polymerizing material relative to the surface of conventional mold assemblies (usually metallic) caused wrinkles and undesirable surface irregularities on the final article. The use of films of the type indicated between the material and bottom of the mold assembly has eliminated this problem and also avoided sanding or polishing of the cast article's major "use" surface. The film may be left in place as long as desired to protect the major "use" surface during further handling. For the polymerizing systems of this invention, films made of the following materials have been found to be satisfactory: polyethylene, polypropylene, polyethylene terephthalate, polyvinyl alcohol, polyvinyl acetate resins and others. The films should be biaxially shrinkable under the action of heat or certain solvents with a uniform thickness in the range of .5 to about 30 mils. As an example of the shrinkages encountered, a 20%–30% volume reduction occurs during the polymerization of methyl methacrylate. This decreases with the amount of filler present. In a 60% filled system about .5 to 3% linear reduction takes place. The preferred material for the bottom of the flat tray is a smooth non-porous metallic composition, although other low cost suitably finished non-porous materials may be used.

With respect to the materials used in the practice of this invention, it is required that the polymerizing media into which the veining pigments are comingled be cured to a degree of about 75% within a time period no greater than 15–45 minutes. Gelation must be substantially completed before the pigments and fillers settle out thereby destroying the pattern and vein depth, yet not before the casting or molding operation is completed.

It is believed that the process and apparatus described herein can be applied to any inorganic or organic polymerizing systems which gel within the above time limits. Many fast gelling systems can be used such as acrylics, methacrylics, polyesters, polyamides, polyformaldehydes, etc., which can be formed in a manner such that gas evolution and shrinkage do not destroy the vein structure and appearance. It is also believed that the system could be employed in fast setting inorganic plasters and cements.

The particular system employed in the development of the apparatus of this invention consists of poly(methyl methacrylate) filled with calcium carbonate and marbleized with a great variety of veining pigments and colors.

The starting sirup for polymer-in-monomer solution may be prepared by any of the methods described in British Pat. No. 870,191 or U.S. Pat. No. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter the hot solution is quenched by the addition of cold monomer containing a polymerization inhibitor. More specifically, a sirup having a viscosity of 0.5–50 poises at 25° C. can be produced from methylmethacrylate by heating the monomeric methylmethacrylate in a jacketed kettle at a temperature of 50–150° C. under refluxing conditions. These conditions normally produce an atactic polymer. Atmospheric pressure is used and the refluxing material is stirred. Heating is conducted in the presence of a very small amount of initiator and from the 0.05–1.0 mole percent of a chain transfer agent, such as the alkyl mercaptans and the mercaptans described in U.S. Pat. No. 3,154,000. When a bulk viscosity in the range of 0.5–50 poises, which corresponds to an inherent viscosity of 0.25–1.0 is attained, and the initiator content has been reduced substantially to 0, that is, below 20 parts per million, the polymerization is stopped by cooling in any suitable manner. In the present invention it is preferred that the final solution contain 10–35% by weight and preferably 25–35% of the methylmethacrylate polymer dissolved in the methylmethacrylate monomer. The polymer has an inherent viscosity of from 0.25 to 1.0 determined at 20° C. using a solution of 0.5 gram of the polymer per 100 milliliters of chloroform in accordance with the method described in F. W. Billmeyer, Textbook of Polymer Chemistry, Interscience Publishing Inc. (1957) page 128.

In the production of filled polymer bases, marbleized synthetic articles comprise predominantly an inexpensive inert inorganic filler (usually in the range of 30–65% and as high as 80% in some cases) held together with a translucent polymer cement. Compatibility of fillers with polymer cement will vary from one polymer system to another; therefore, the words "inert" or "compatible" must be linked to the polymer system employed. Materials which are generally used as fillers are, for example, $TiO_2$, titanates, barium sulfate, calcium carbonate, while leads, lithopone, China clays, magnesite, mica, iron oxides, Spanish, Persian, American siennas, etc. Fillers range from very dark, in the case of iron oxides, to the very white, in the case of $TiO_2$. The color imparted by the filler has been referred to as the base color in a marble. That is, it is the background through which the veins run. Dyes and colored pigments can be homogeneously mixed with the light fillers to produce the desired base color.

For special effects, fillers can comprise glass frits, beads, powders, fibers and/or metallic, organic or inorganic fibers of varying size, shape or color and combinations of these.

Depending upon the polymer system employed, the filler can be added either before or after the gelation starts. Usually, a dispersing agent is introduced to insure a homogeneous mixture. Methods for dispersing fillers are well known in the art. A particularly preferred procedure outlined for methylmethacrylate systems is as follows:

A methylmethacrylate polymer-in-monomer sirup produced under the processes described above containing 25% polymer and having a viscosity in the range of 20–24 poises is placed into a cylindrical mixing vessel and mixed using a sigma blade mixer with anhydrous calcium carbonate of particle size in the range of 6–10 microns being commercially available under the name of "Non Fer Al," a precipitated particulate calcium carbonate having low iron content is added in quantities to the sirup ranging between 40 and 65%. To the sirup-filler mix is added a dispersing agent to the extent of 0.1% to 1% by weight of the filter present. For example, zinc stearate is added in quantities comprising from 0.1–0.1% of the calcium carbonate. Polymer monomer sirup containing 30–70% calcium carbonate filler ranges in viscosity from 30–60 poises.

Although the above example indicates that only mild mixing conditions are required in the presence of a surface active agent to disperse the filler, it should be understood that any type of mixing suitable to disperse the filler evenly in the monomer polymer solutions can be employed. It has been found, however, that the majority of the above-mentioned fillers, including such fillers as glass, silica, and metal particles, having diameters less than 10 microns, can be suitably dispersed by the above-described manner.

The above-described filled sirup can be used successfully when the teachings of copending applications Ser. No. 434,691, filed Feb. 23, 1965 in the name of Donald H. Slocum, and Ser. No. 434,692, filed Feb. 23, 1965 in the name of George E. Munn, are followed. At present the only successful catalyst known to us to effect a fast cure with the materials of this invention is the presence of 0.05–5 mole percent of a metal salt of a hemiperester of maleic acid having the following formula:

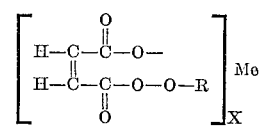

wherein Me is a metal, preferably selected from the group consisitng of Group I-A metals (Handbook of Chemistry and Physics, 42 addition, Chemical Rubber Publishing Co., Ohio, 1960–1961, pages 448–449) (sodium, potasium, lithium, etc.), Group II–A metals (Loc. cit.) (calcium, magnesium, strontium, barium, etc.) zinc, lead, cobalt, nickel, manganese, and copper;

x is an integer that has a value of 1 or more up to and including the valence of the metal; and R is a saturated tertiary alkyl radical, preferably tertiary butyl.

In a process for making un-marbleized filled polymer, 250 parts of a sirup described previously, was mixed containing 60% calcium carbonate, with 0.75 part of t-butylperoxy maleic acid and 0.3 part of finely divided calcium hydroxide (the latter forming catalyzing amounts of the calcium salt of the hemiperester of maleic acid). The mixture is stirred and poured into a tray and allowed to stand open to the air at room temperature. The mixture gels within 20 minutes, but the slab formed therein is removed from the mold after one hour's time. Examination of the slab indicated that calcium carbonate filler was evenly dispersed throughout.

As described above, a white unveined slab containing 60% calcium carbonate is obtained in less than one hour's time with completely dispersed filler. Similar results are obtained if lower amounts of calcium carbonate and calcium hydroxide are used. The use of other hemiperesters and salts providing alkali are described in the copending Munn application. It is contemplated that other compatible and inert fillers can be used with similar results.

With respect to the preparation of the colored stream or veining pastes, the veins in marble, as previously stated, may have a wide range of color. To form these veins in marble slabs it is necessary to have pastes of varying viscosity. The coloring matter selected for these pastes is commercially available from a wide variety of sources and is obtained under a number of trade names. Coloring matter that is insoluble or only slightly soluble in monomer or mixtures of monomers is incorporated in the polymerizable mixture to impart veins. The term "pigment" as applied to such coloring matter is here used in the broad sense of a powdered or powderable material which can be mixed with liquid to impart color thereto, including black and white. The term "dye" thus includes lakes, toners, and organic and inorganic pigments. The term "pigment" includes those that are opaque, translucent, and transparent. Transparent pigments are those which impart color without opacifying and without being dissolved. Inorganic pigments may be natural or synthetic. They are usually metallic compounds. Typical of these are barium sulfate, titania zinc oxide, zinc sulfate, zirconium oxide, various lead compounds, lithopone, etc. Also included are black iron oxides; hydrated yellow oxide, venetian reds; cadmium yellows, oranges, reds, and maroons, including cadmium sulfoselenide, cadmium yellows prepared with zinc sulfide or barium sulfate, cadmium lithopones, or cadmium sulfoselenides; umbers; metallic browns, such as calcium limonite or siderite; brown iron oxides; ochre; synthetic yellow or orange iron oxides; chrome yellows; antimony yellow; chrome greens; iron blues; cobalt violets; carbon blacks, including channel and furnace blacks; luminous and phosphorescent pigments, including special grades of zinc sulfide and activating agents; leafy pigments giving pearlescent effects, such as pearl pigments; lead iodide; mercurious chloride; bismuth oxide; metal bronzing powders; aluminum powders; aluminum bronze; copper aluminum bronze powders; gold leaf; silver; copper; and nickel.

Organic pigments are included in a large number of classes. The organic coloring matter differ considerably in light fastness and are selected not only for the color or shade desired but for conditions which are encountered in the use of the pigmented plastics and in the polymerization of the mixture. Thus, organic pigments are selected not only for shade but also resistance to the possible action of the initiator system. Conversely, the initiator system may be adapted to the pigment. In the case of organic colors which tend to be soluble in the monomer system, the color may be used in a lake.

The colored pigment or pigments to be added as veining materials should be dispersed in monomer or sirup described previously. Some pigments can be worked, or milled, into monomer polymer or mixtures of monomer and polymer without added dispersing agents. In other cases it may be desirable to utilize a dispersing agent to overcome agglomeration of pigment. Typical dispersing agents include lignin sulfonates, polymers of maleic anhydride, dodecyl sodium sulfate, etc.

Pigment may be mechanically mixed with monomer or monomers or with a monomer-polymer mixture or with simply a polymer. The resulting mixture is then taken up in the rest of the monomer or monomer-polymer mixture. Milling of pigment may be done with a wide variety of polymeric materials which may be the same as, or different from, that to be used in the monomer-polymer system. Any soluble acrylic polymer may be used in this way. Likewise, pigment may be milled with a soluble styrene polymer or copolymer. Vinyl chloride and/or acetate polymers may also be used and may be especially useful for dispersing carbon blacks. Cellulose acetate or cellulose acetate butyrate are also good media. Nitrocellulose is commonly used with carbon black and with dispersions of phthalocyanine colors.

When a plasticizer is used, it may be desirable to grind or mill the pigments and colors therein. A mixed plasticizing system of liquid monomer and polymer is quite effective in dispersing the various pigments and the resulting paste is readily co-mingled with a filled monomer-polymer system. As previously stated, the viscosity of the colored paste or solution is quite important in the control of the various vein dimensions and vein depth. Therefore, it requires great care in determining a particular method for mixing colored paste and sirups of any one viscosity. For each batch of color, the viscosity must be controlled at the time of mixing since the commercially available colors vary from batch to batch and from brand to brand. However, it is possible for the practice of this invention to lay down viscosity ranges which can be made up by trial and error techniques for each batch of color to be added. The viscosity of any one particular formulation will very from day to day since the degree of polymerization in the unfilled sirup will change slightly from batch to batch and the degree of dispersion of the color in the media in which it is purchased will change from one brand to another. However, a number of typical pastes are shown in Table 1.

TABLE 1

| Mixture | Color designation | Composition (parts by wt.) | Sirup (parts by wt.) |
| --- | --- | --- | --- |
| A | Brown | 10 Parts raw umber | 90 |
| B | Malaco black | 4.75 Iron black<br>.5 Raw umber | 95 |
| C | Olive green | 25 Light chrome green<br>2 Dark chrome green<br>1 Lamp black | 500 |
| D | Shell pink | 9 TiO$_2$ (dispersed in 3 pt. sirup).<br>5 Venetian red<br>.08 Bulletin red | 500 |
| E | Talisman brown | 0.5 Lamp black<br>2.5 Raw umber | 500 |
| F | Florentine grey | 3 TiO$_2$ (1 pt./3 pt. sirup)<br>2 Iron black<br>0.5 Yellow ochre | 500 |
| G | Persian gold | 10 TiO$_2$<br>4 Raw sienna<br>1 Burnt umber<br>.25 Raw umber<br>.25 Venetian red | 500 |
| H | Chinese red | 50 Bulletin red<br>0.5 Prussian blue | 200 |

Filled polymerizing organic polymer sirups containing initiators, catalysts, modifiers and base colored fillers, such as calcium carbonate, iron blacks, etc., are made into articles having an appearance and structure pleasingly similar to marble by adding limited quantities of one or more contrasting colored pigments. The description and disclosure of the invention deal primarily with poly (methyl methacrylate) sirups, but are considered generally applicable to other polyester systems. Contrasting colors which are used to simulate veins must be carried into the polymerizing bulk by means of mixing devices operating under conditions which produce a desired degree of shear, with an extremely low degree of mixing of the colored pigment in the polymerizing bulk. Relatively straight, pleasingly varied veins can be produced by conducting the bulk of the polymer through an orifice under streamlined flow conditions prior to filling the mold.

A preferred apparatus embodying principles of the invention involve folding fine streams of the vein-forming pigments or colors ranging in viscosity from 0.8 to 2.5 poises and in thickness from 1/10 to 1/2 inch into a mass of viscous polymerizing sirup having a viscosity within the range of 30 to 70 poises. Thereafter the polymerizing mass is folded at least 30 to 70 times by engagement with a rotating mixing blade having leading edges of 1/8 to 3/4 inch in width and preferably in the range of 3/16 to 3/8 inch, moving at top speeds ranging from 5–100 ft./min. and preferably 15–40 ft./min., directed such that in one sweep the pigment is folded toward the center of the mass while in the second sweep the pigment veins are pushed toward the outer edges of the mass prior to being passed through an orifice having dimensions of at least 2 inches in width and opening distance between 1/4 and 1 inch, and thereafter being drawn in a streamlined or straight-lined flow for a distance of at least 4 inches (and free-falling from the mixer to the casting surface for distances no greater than 3–4 inches) prior to entering a mold assembly.

The preferred apparatus embodying principles of this invention is shown in FIGS. 1, 2, 3, 5 and 7.

As seen in FIG. 1A the apparatus comprises a movable support element 1 with a vertically extending passageway 2 extending through it. The passageway 2 is provided with a tapered shoulder portion 3 which cooperates with opposed tapered shoulder portion 4 on casing element 5 to rotatably support the main apparatus elements of the invention. Elements 5, 6, and 7 form a first composite housing assembly in which the polymerizable ingredients or materials are brought together and intimately mixed with a high intensity mixing action. An upper transverse plate element 15, together with an interior cavity in element 7, form an upper chamber 13 in the composite housing assembly. An inlet conduit 14 is provided to supply one of the inlet materials into the upper chamber. A lower transverse plate element 17 together with an interior cavity in element 5, form a lower chamber 19 in the composite housing assembly. Lower chamber 19 defines Zone I previously discussed in which the high intensity mixing action occurs. The upper transverse plate element 15 is provided with a number of passageways or holes extending therethrough in a vertical direction, as viewed in FIG. 1A, in each of these holes is secured one end of a tubular element 16, the other end of which is secured in a corresponding hole or passageway in the lower transverse plate element 17 such that the upper chamber 13 is in free communication with the lower chamber 19 via the hollow interiors of the tubular 6 between the upper and lower transverse plate elements elements 16. A middle chamber 20 is formed in element 15 and 17. An inlet conduit 21 is provided to supply the other inlet materials into the middle chamber 20. The inlet materials are supplied to inlet conduits 14 and 21 by variable pumps (not shown) at predetermined flow rates and pressures. The lower transverse plate is provided with additional vertical passageways or holes 22 which maintain free communication between the middle chamber 20 and the lower chamber 19. A vertically extending rotatably mounted shaft 8 extends through elements 5, 6, and 7 of the composite housing assembly and is drivingly connected at its upper end by means of sleeve coupling element 10 to the rotary output shaft of a variable speed pneumatic motor 11 which is secured in operative position at the upper end of the composite housing assembly which comprises elements 5, 6, and 7. Air under pressure is supplied to motor 11 via conduit 12. The lower end of shaft 8 extends through the lower chamber 19. Helical blade mixing elements 23 and 24 are secured to the shaft 8 for rotary movement therewith in the lower chamber 19, the direction of rotation of the shaft and mixing elements 23 are as indicated in FIG. 1A. A multiple element composite conduit assembly is operatively connected to the lower portion of element 5 and in free communication with the lower chamber 19. The composite conduit assembly comprises tubular element 25, elbow unit 26, tubular unit 27, elbow unit 28 and tubular unit 29. An adjustable valve element 30, secured to shaft 31 by machine screws 32 is mounted in tubular conduit element 25 to control the flow through the conduit assembly and the pressure in lower chamber 19. The valve element position is varied by varying the knurled disk 33 which is secured to shaft 51 by set screw 35. The valve element is secured in position by a locking screw 34. As best shown in FIG. 1B and FIG. 2 two inlet conduits 36 and 37 are secured on tubular conduit element 29 by means of coupling units 38 and 39 to provide for introduction of colored or pigmented material into the polymerizing material moving through the composite conduit assembly as shown by the arrows. The colored material is supplied at predetermined pressures and flow rates by means not shown. Tubular element 29 communicates with the interior of a second composite housing assembly which comprises a cylindrical side wall element 44, a bottom element 45, and a top element 43. The top element 43 of the second composite housing assembly is coupled to the tubular element 29 by means of a coupling arrangement indicated by reference numeral 42 which comprises locking rings 81 mounted in annular grooves in the exterior of element 29 and engaging top element 43 and which further comprises a bearing assembly 80 and a support ring 82 suitably rigidly secured to the outside of tubular element 29. The entire second composite housing assembly is movably supported on element 29 by means of this coupling arrangement and can be moved freely in the horizontal plane by means of the arm 59 and manually operable handle 60 or by means of a mechanical programming means schematically shown in FIG. 3. An extrusion orifice or outlet 46 is provided near the bottom of the cylindrical side wall element 44 of the second composite housing assembly. An inclined guideway or chute is positioned adjacent outlet 46 and provided with a bottom element 47 and side elements 48 for the purpose of directing extruded material issuing from the orifice 46 into a mold assembly which comprises a flat bottom element 62 and side elements 63. In addition the film (identified by the reference letter F) discussed previously is also shown in position between the extruded material and the bottom element for the purpose previously mentioned. A material displacing member or assembly 54 is rotatably mounted inside the second composite housing assembly on a vertical shaft 49 which is coupled to drive shaft 50 of a variable speed rotary pneumatic motor 52 an shown in FIG. 1B. The material displacing member 54 comprises an upper rail element 55 and a parallel lower rail element 56. A plurality of material deflecting blade elements 57 extend between the rail elements and are adjustably secured to the rail elements by suitable means such as the machine screw 58. Blade elements 57 are of varying sizes and arranged as shown in FIG. 5 to accomplish the desired low intensity mixing action in the lower portion of the second composite housing assembly (Zone II). With the preferred arrangement of blade elements 57 shown in the drawings, the material in Zone II will be displaced outwardly by engagement with the blade elements 57 on one side of the shaft 49 and inwardly by engagement with the blade elements 57 on the other side of shaft 49. In the embodiment shown in FIG. 5 the angle Z is 50° for the blade elements on one side of the shaft 49, and is 140° for the blade elements 57 on the other side thereof.

The rates and pressures at which the various materials are supplied, the size of the composite housing assemblies and the conduit assembly, and the type of mixing action are all predetermined and controlled to produce and reproduce the desired vein structure and pattern in the final cast articles.

For a preferred apparatus suitable for producing rectangular thin cast articles the following specific information is given.

Conduits 14 and 21 which supply the basic material to chambers 13 and 20 from storage tanks are ¾ inch in diameter and the material is moved or pumped by variable speed positive displacement gear pumps. With the material having viscosities in the range from 55–65 poises each pump is adjusted to move about 75–85 cubic inches of filled polymerizing material per minute into the lower chamber 19. The lower chamber is about 2 inches in diameter and about 3 inches in height. The polymerizing ingredients passing through conduits 14 and 21 are subdivided by hollow tubular elements 16 and passageways 22 into small streams about 3/32 inch in diameter. Helical blade mixing elements 23 and 24 constitute the active elements of a reverse helix mixing arrangement which is designed to produce the flow pattern shown in FIG. 1A moving against the outlet ends of passageways 18 and 22. The motor 11 which drives mixing elements 23 and 24 is run at between 1000 and 3000 r.p.m. The conduit assembly connecting Zone I with Zone II is about 1 inch in diameter and is about 16 inches long. Valve element 30 which controls the pressure in Zone I and the rate of flow through the conduit assembly is operated at from 25%–50% open. The colored stream or pigment paste stream conduits 36 and 37 are about ⅛ inch in diameter and are each supplied by a positive displacement pump at a rate of about 2–2.5 cubic inches per minute when the viscosity is in the range from .9 to 1.9 poises. The second composite housing assembly containing Zone II is about 6 inches in diameter and about 7 inches deep. The level of the collected polymerizing material is as indicated generally in FIG. 1B. The drive motor 52 operates between about 15 and about 40 r.p.m. in driving the material displacing assembly 54 at velocities between 5 and 100 ft./minute at its extremities. The blade elements 57 are preferably arranged as shown in FIGS. 1B and 5, each blade being between 3/16 and ⅜ inch in thickness and totally immersed in the polymerizing material. The extrusion orifice 46 is about ¼ inch wide and 6 inches long measured as a chordal distance on cylindrical wall element 44. The length of the guide or chute which comprises inclined element 47 and side elements 48 is about 4 inches long.

In operation, the preferred arrangement is carried out in a spark-free well-ventilated environment in order to safely handle the volatile organic solvents involved. One of the conduits 14 or 21 is supplied with filled methyl methacrylate monomer and polymer containing peroxide catalysts and base-colored pigments at a predetermined pressure and rate, and the other is supplied with a similar composition having a chain transfer agent initiator instead of the peroxide catalyst at a predetermined pressure and rate. Alternately, all of the filled sirup can be added via one of the conduits 14 or 21 while only catalyst or initiator is added via the other in order to increase the storage life of the monomer in polymer sirups.

The catalyst could be added separately into the lower chamber 19 if desired.

Figure 6:
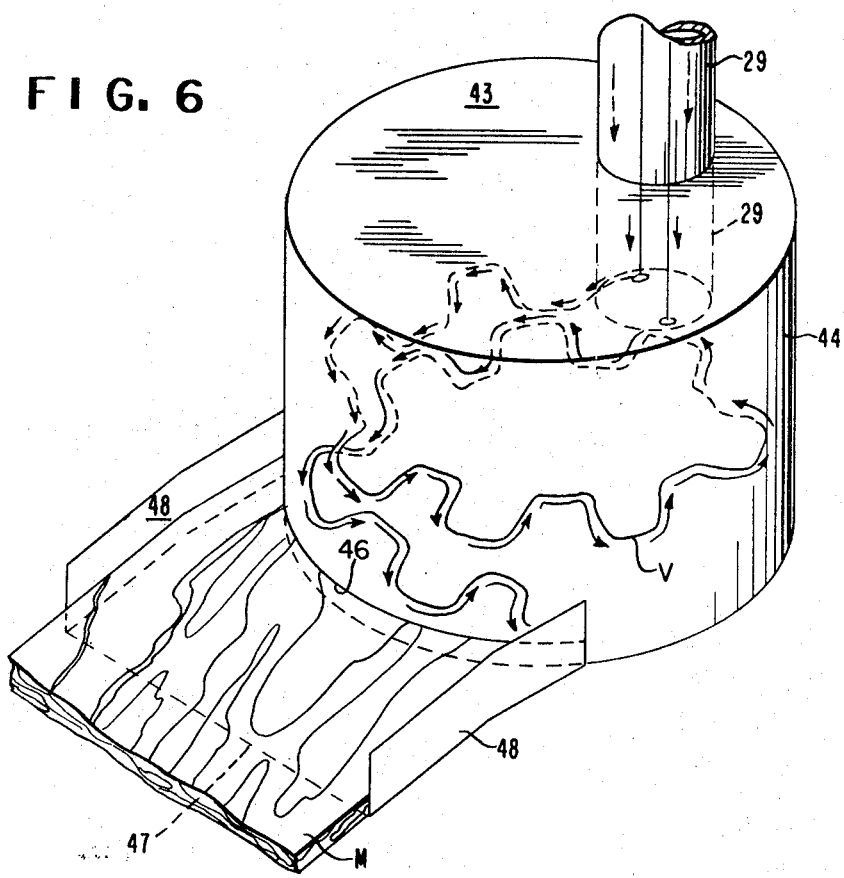
FIG. 6 is a perspective view of a cast object embodying features of this invention with part broken away and shown in section to show the pattern and configuration of the colored stream in the base material which produces the "marble-like" effect.

The material supplied to the upper chamber 13 is subdivided into numerous small streams as it moves downwardly through hollow tubular elements 16 and passageways 18 in lower transverse plate element 17 and is extruded as a number of fine streams into the lower chamber 19. The material supplied to the middle chamber 20 is subdivided into numerous streams as it moves downwardly through passageways 22 (which are interspersed between passageways 18 in the plate element 17) and is extruded as a number of fine streams into lower chamber 19. The interspersed extruded small streams in lower chamber 19 are subjected to the high intensity mixing action of high speed helical mixing elements 23 and 24 to produce an intimately thoroughly mixed homogeneous mass of polymerizing material which then passes the valve element 30 into the conduit assembly comprising elements 26, 27, 28, and 29. At the upper end of element 29 as viewed in FIG. 1B the pigmented or colored streams, which ultimately form the desired vein pattern, are introduced via conduits 36 and 37 at predetermined rates and pressures. The material issuing from the lower end of conduit 29 is collected in the second composite housing assembly and subjected to the controlled low intensity mixing action of the material displacing assembly 54 before being extruded in a stream M of controlled dimensions through orifice 46. After passing through orifice 46 the extruded stream M passes along an inclined guide under streamline flow conditions from which it is laid down on a film F in a mold assembly as shown in FIG. 1B where gelation and/or curing occurs. The low order mixing action which occurs in the second composite housing assembly and Zone II involves movement of the material issuing from the conduit element 29 descending in a general spiral path toward the extrusion orifice 46 while being subjected to alternating radial displacements inwardly and outwardly as the rotary assembly 54 engages the mass. A generalized schematic showing of this action is given in FIG. 6.

Figure 7:
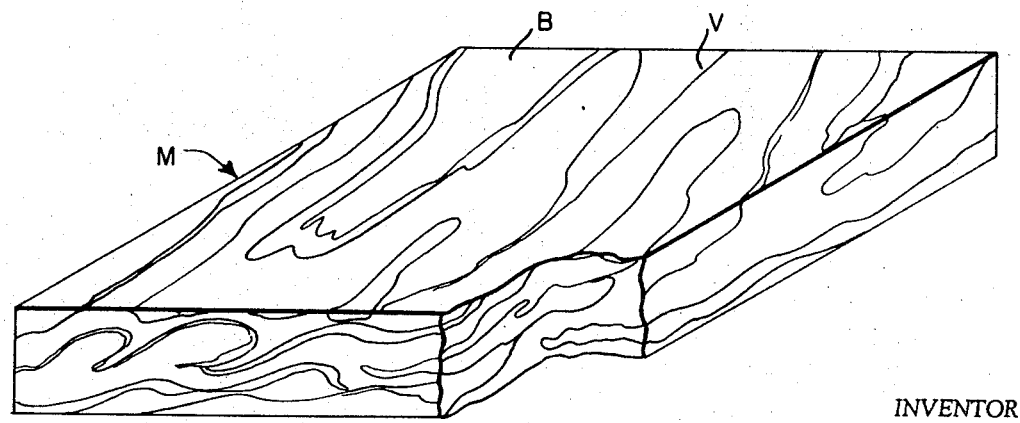
FIG. 7 is a perspective schematic showing of movement of polymerizing material and pigment stream through second mixing zone and out of zone toward mold assembly.

One version of a product embodying principles of the invention is shown in FIG. 7 the base-colored material indicated at B and a vein of the vein pattern being indicated at V.

Especially under continuous operating conditions the vein pattern structure and appearance of the material in extruded streams or at a given point is reproducible and will be substantially repeated by the apparatus at a later point to make possible close matching of the patterns produced in the cast articles. When the extruded stream is narrower than the mold assembly additional predetermined and reproducible variations in the vein pattern of the final article can be achieved by controlling the laying down of the stream in the mold by a controllable programming means.

Although certain preferred embodiments of the invention have been described in detail in accordance with the patent law, many modifications and variations within the spirit of the invention will occur to those skilled in the art and all such are considered to fall within the scope of the following claims.

What is claimed is:

1. An improved mold assembly for receiving a shrinkable solidifiable mass of material having given shrinkage properties during solidification, said assembly comprising a surface element for supporting the solidifiable material thereon, said element having shrinkage properties different from said given properties of the solidifiable material during solidification thereof, said assembly further comprising a thin smooth continuous layer of a nonreactive organic polymeric material in engagement with and supported by said element such that said layer is maintained between said element and solidifiable material supported thereon, said layer of material having properties such that relative movement may occur between said layer and said element and such that shrinkage of the solidifiable material is matched by corresponding shrinkage of said layer in order to prevent roughness or wrinkling of the engaged surface of solidifiable material on said layer during solidification thereof.

2. The improved assembly of claim 1 in which said shrinkage properties are those related to change in temperature of the materials.

3. The improved assembly of claim 1 in which said shrinkage properties of said materials are those related to the action thereon of solvents.

References Cited

UNITED STATES PATENTS

| | | | |
|---|---|---|---|
| 2,543,332 | 2/1951 | Olsen et al. | 249—82 |
| 2,687,555 | 8/1954 | Anspon et al. | 249—82 X |
| 2,937,476 | 5/1960 | Davies | 249—82 X |

J. HOWARD FLINT, Jr., Primary Examiner

U.S. Cl. X.R.

249—82, 114